April 19, 1960 J. G. SCOTT ET AL 2,933,144
WELL LOGGING METHOD AND APPARATUS
Filed Aug. 12, 1954 6 Sheets-Sheet 3
FIG_2B_
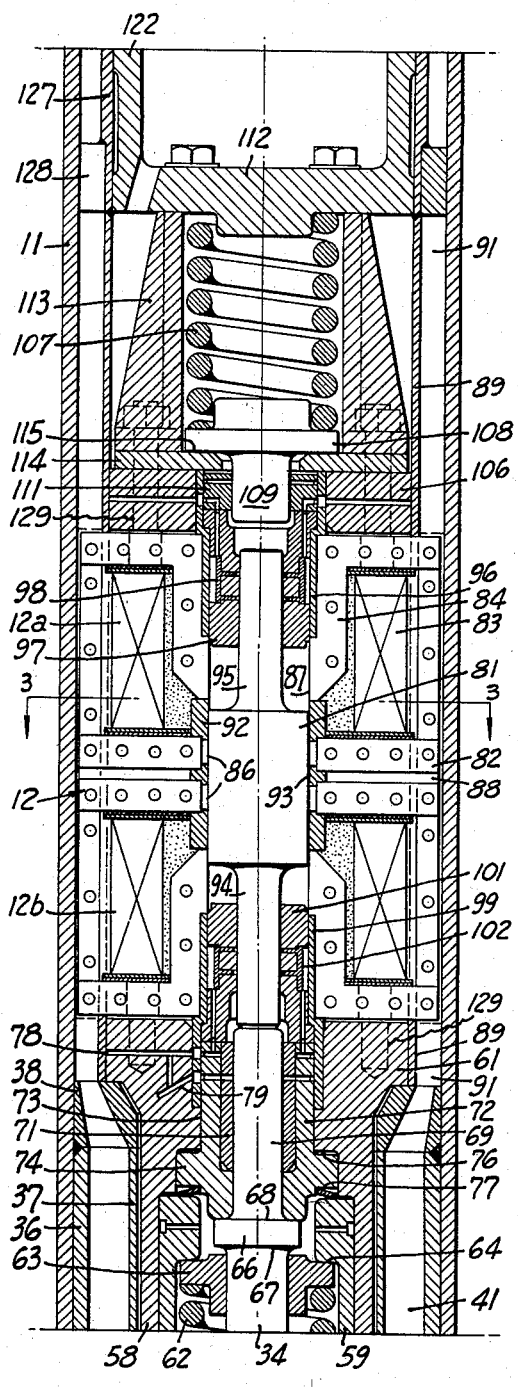
FIG_2C_
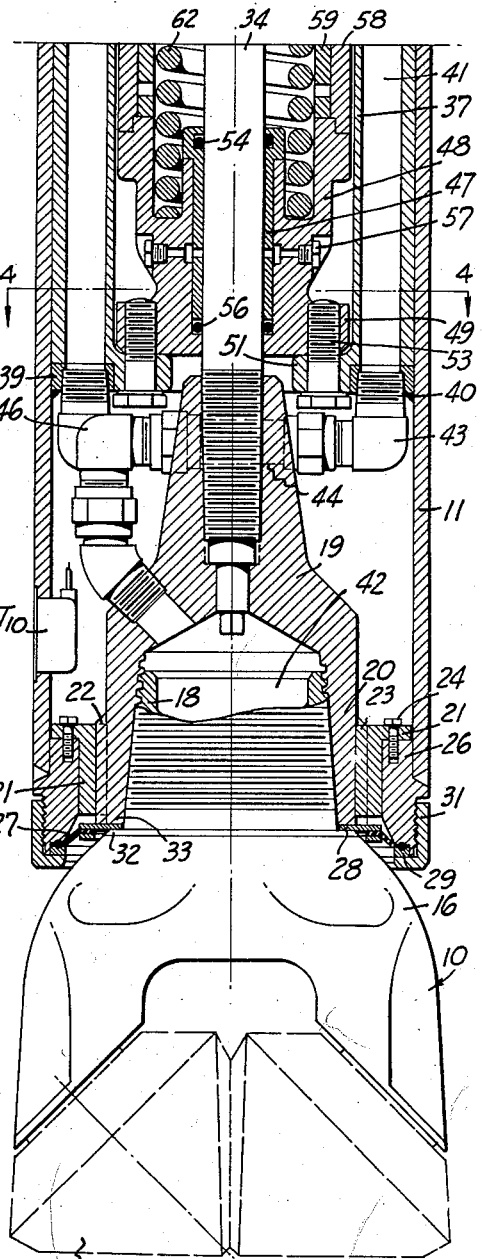
INVENTORS
JAMES G. SCOTT
ROLAND A. FREEMAN
BY REESE T. HOUSTON
ATTORNEYS

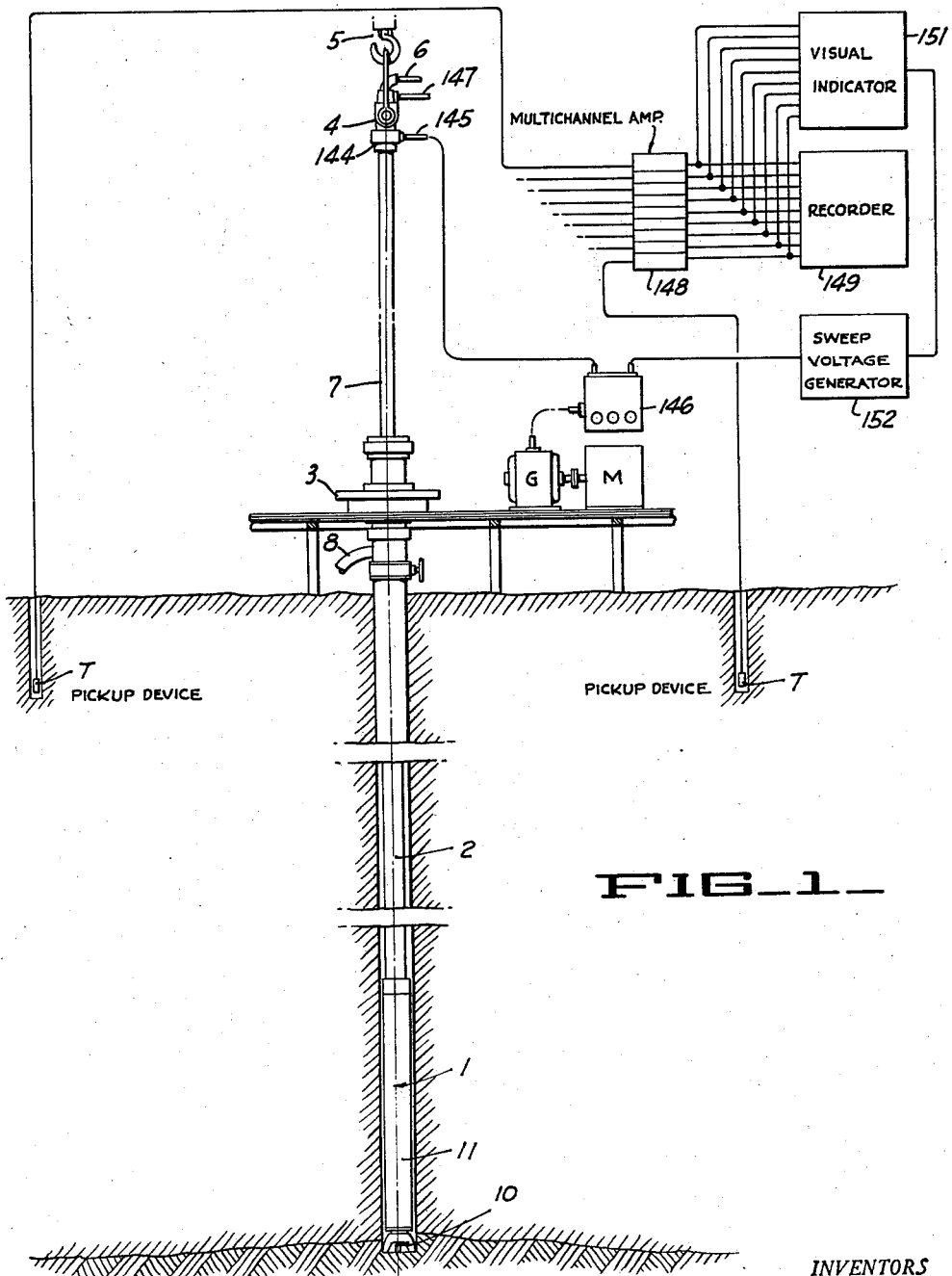

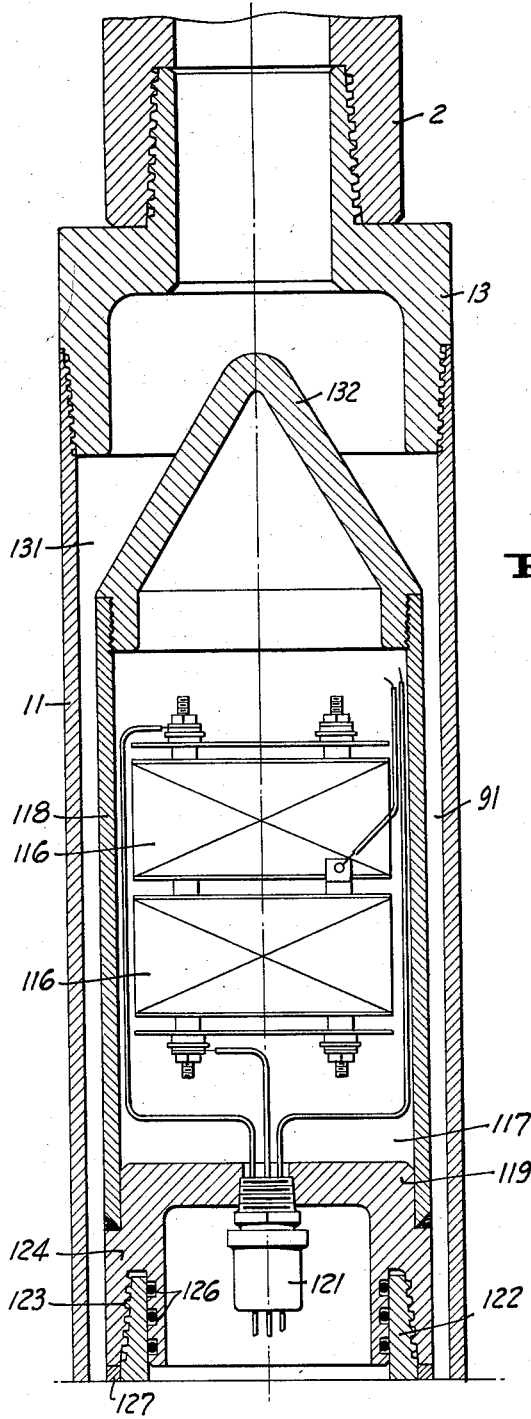
FIG_2A_

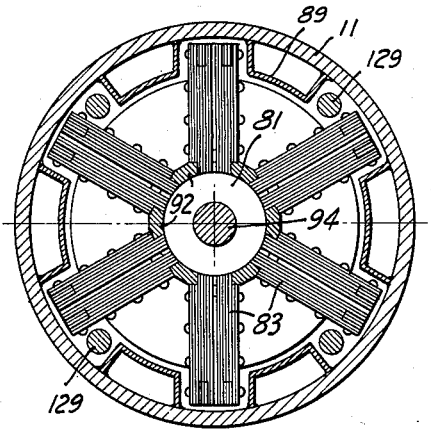
FIG_3_
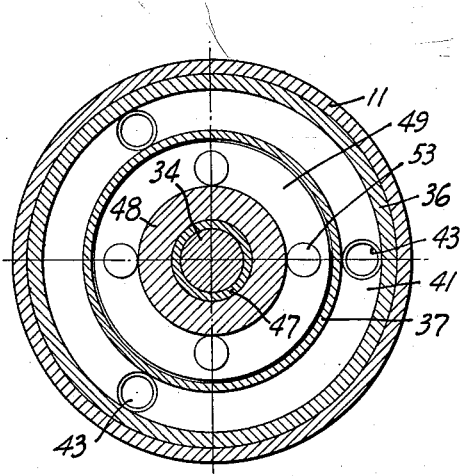
FIG_4_
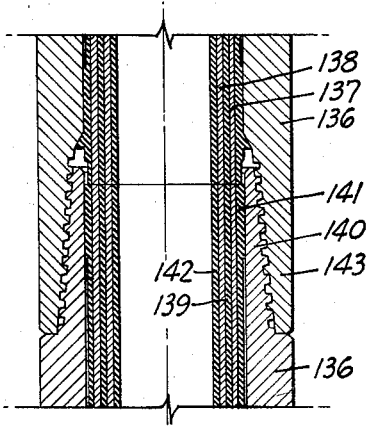
FIG_6_
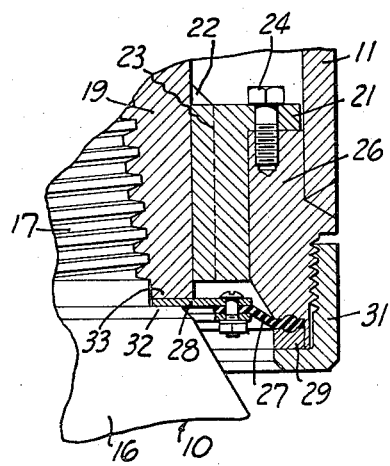
FIG_5_
INVENTORS
JAMES G. SCOTT
ROLAND A. FREEMAN
BY REESE T. HOUSTON
ATTORNEYS

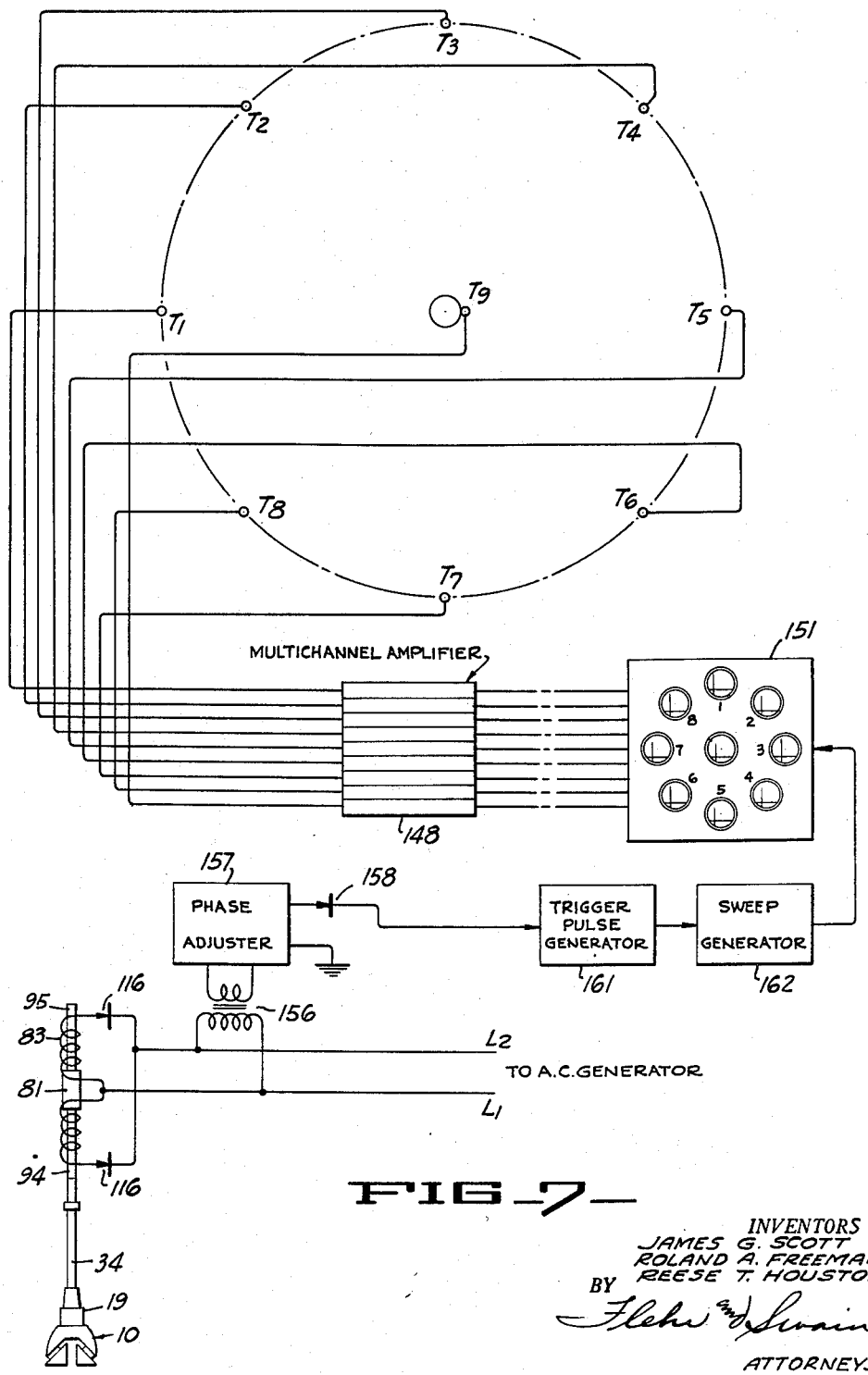

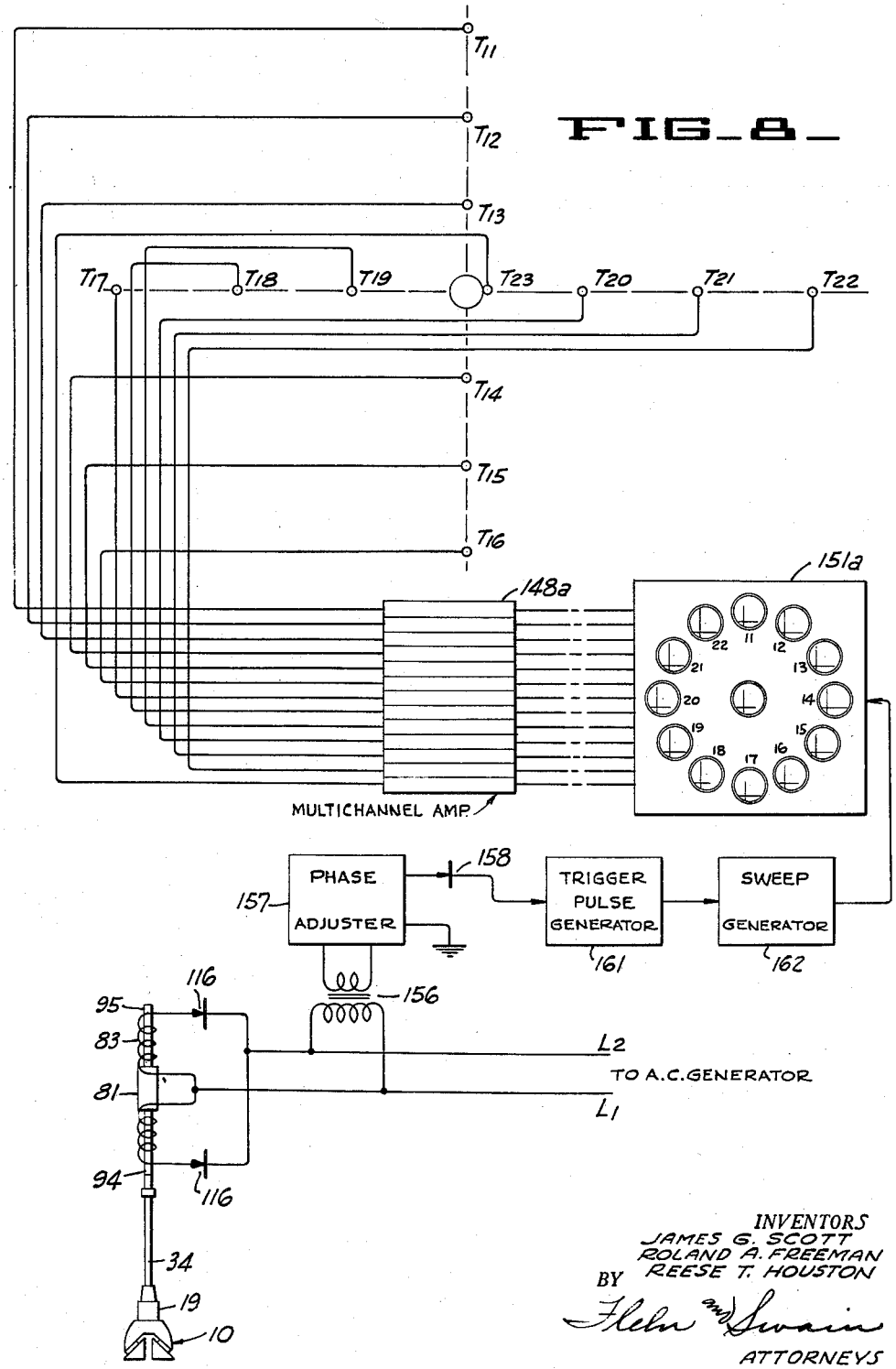

ically illustrating a well being drilled by the use of equipment of the type previously mentioned, in conjunction with additional equipment for the purpose of carrying out the present method.

Figures 2A, 2B, and 2C, when taken together, form a side elevational view in section illustrating drilling equipment of the type disclosed and claimed in our aforementioned application Serial No. 452,522, now Patent No. 2,827,263.

Figures 3 and 4 are cross-sectional views taken along the lines 3—3 and 4—4 of Figures 2B and 2C respectively.

Figure 5 is a detail in section showing the spline driving connection to the drill head.

Figure 6 is a cross-sectional detail showing a special type of drill stem incorporating current carrying conductors.

Figure 7 is a schematic diagram of equipment employed to carry out the present method showing detecting devices disposed to detect waves reaching the area adjacent the well.

Figure 8 is a schematic diagram of equipment employed to carry out the present method showing detecting devices disposed to detect waves reaching the surface at different distances from the well.

Figure 1 schematically illustrates drilling equipment of the type disclosed in our above mentioned application Serial No. 452,522, now Patent No. 2,827,263.

Thus the assembly designated generally at 1 is attached to the lower end of the drill stem 2. At the top of the well conventional equipment such as a rotary table 3 is employed for rotating the stem during drilling. A swivel head 4 is attached to the upper end of the "Kelly" 7 and is carried by the traveling block 5 of a conventional drilling derrick. The swivel head 4 is connected to a pipe 6 for introducing mud under pressure. Mud is discharged downwardly through the drill stem, through ducts in the drill head 10, and then flows upwardly between the stem and the well casing or wall to the surface of the well, where it may be discharged through pipe 8.

In the present instance it is assumed that the assembly 1 is the same as disclosed in said copending application. Such an assembly is disclosed in Figures 2A–2C, inclusive. In general, this assembly serves to carry the drill head 10, and it includes an electrical actuator which is adapted to apply vertical impacts to the drill head at a constant frequency to effect percussion drilling. Drill head 10 is disposed at the lower end of the tubular housing 11, the latter serving to enclose and mount the assembly. The electrical actuator is designated generally at 12, and is of the resonant type. The upper end of the housing is attached to the coupling member 13, which in turn forms the lower end of the rotary drilling stem.

The drilling head 10 in this instance consists generally of a body 16 carrying a plurality of toothed rotary cutter assemblies 17. Such drilling heads are well known to those familiar with oil and gas drilling methods, and are manufactured in different sizes and types, for various kinds of drilling conditions. The threaded shank 18 of the head is engaged with the mounting member 19, which, in turn, is located within the lower part of the housing 11. The lower portion 20 of member 19 is slidably received in the bushing 21, which can be made of suitable material, such as bronze. A suitable torque transmitting connection is formed between these parts, and may consist of a plurality of splines 22 formed on the member 19, and slidably engaging slots 23 formed in the bushing 21. The bushing 21 is attached by suitable means such as the screws 24, to the ring 26, the latter being suitably secured as by welding to the lower end of the housing 11.

---

United States Patent Office 2,933,144
Patented Apr. 19, 1960

2,933,144

WELL LOGGING METHOD AND APPARATUS

James G. Scott, Simi, Roland A. Freeman, Santa Monica, and Reese T. Houston, Simi, Calif., assignors to American Percussion Tool Company, San Francisco, Calif., a corporation of California Application August 12, 1954, Serial No. 449,336

4 Claims. (Cl. 181—.5)

This invention relates generally to the drilling of oil, gas, or water or like earth wells, and more particularly pertains to methods and apparatus for indicating and/or recording pertinent information during drilling operations.

In our copending application Serial No. 445,666 filed July 26, 1954, now Patent No. 2,868,507 and entitled Well Drilling Equipment and Method, there is disclosed a drilling equipment having an electrical actuator which applies impacts to a drill head at a relatively high constant frequency. The mounting means for the drill head and the actuator may for example be attached to the lower end of a drill stem of rotary drilling equipment. In operation the drill head is rotated in accordance with conventional rotary drilling practice and the actuator is energized to apply impacts to the drill head at a rapid rate to effect percussion drilling. At the same time rotary mud is circulated through the drill head for the removal of cuttings. In our additional copending application Serial 452,522 filed August 27, 1954, now Patent No. 2,827,263, and entitled Well Drilling Equipment and Method, we have disclosed a particular embodiment of such equipment in which the motive means for rotating the drill head and the means for circulating rotary drilling mud are built as a part of the complete assembly. The complete assembly in this instance is lowered into the well by means such as a cable.

The present invention is predicated upon our discovery that when drilling operations are being carried out by our equipment, as described above, waves are continuously propagated from the drilling zone. A portion of these waves are reflected and/or refracted by the surrounding formations. The composite wave may be detected at the top of the well. We have found that indications obtained from such detected waves reveal valuable information, including the character of the formation upon which the drill head is operating, the character of the formation surrounding the bore hole and the character of the formation below the drill head.

In view of the foregoing it is a general object of the present invention to provide a novel method for obtaining valuable information during drilling operations, which will facilitate operation of the drilling equipment and logging of the well with respect to geological formations.

Another object of the invention is to provide a method of the above character which is particularly useful in conjunction with our well drilling equipment previously described, which utilizes percussion drilling by application of impacts at a constant frequency, in conjunction with rotation of the drill head.

Another object of the invention is to provide equipment suitable for carrying out our method, including equipment for making records and visual indications.

Additional objects and features of the invention will appear from the following description in which the preferred embodiment has been set forth in detail in conjunction with the accompanying drawing.

Referring to the drawings:

Figure 1 is a side elevational view in section schemati-

A suitable seal is formed between the head and the ring 26 to prevent entrance of mud or cuttings. For this purpose we have shown a diaphragm 27 of flexible material such as fabric reinforced natural or synthetic rubber, having its inner peripheral edge clamped to a gasket ring 28, and its outer margin clamped between the end piece of the ring 26 and the annular washer 29. The clamping washer 29 is held in place by the ring 31, which is internally threaded and engaged with the threaded exterior of ring 26. The inner margin of the gasket ring 28 is tightly clamped between the shoulder 32 on the head and the opposed end face 33 of member 19.

The upper end of the member 19 is attached to the impact transmitting bar 34 which extends concentric with the axis of the housing 11. As will be presently explained it is the upper end of this bar that receives impacts from the electrical actuator.

Interposed between the member 19 and the electrical actuator there is a structure including guide means for the bar 34, and a recoil spring. As shown particularly in Figures 2B and 2C this structure consists of concentric tubes 36 and 37, which have their upper ends attached to a mounting ring 38, and their lower ends attached to a similar member 39. These tubes are fixed to the housing 11 as by means of the weld connection 40. The space 41 between these tubes serves to conduct drilling mud and is connected with the mud receiving space 42 in the shank 18 of the drill head. For this purpose, space 41 is shown communicating with a plurality of pipe fittings 43, which in turn are connected by the flexible hose sections 44 with pipe fittings 46. The latter fittings directly connect through the member 19 to deliver mud into the space 42. In accordance with customary practice the cutter head is provided with ducts (not shown) which conduct the mud to the area being drilled, whereby chips or cuttings are removed.

The bar 34 is slidably fitted within the bushing 47, which in turn is fitted within the end casting 48. This casting has a lower flange 49 which is clamped to the flange 51 on the lower end of tube 37, by suitable means such as the screws 53. Suitable lubricant sealing means such as the resilient O-ring seals 54 and 56, can be provided at the upper and lower ends of the bushing 47. Also suitable fittings 57 can be provided for the introduction of lubricant.

The lower end casting 48 seats an upper annular body 58, and the latter is bored and fitted with the bushing 59. The upper end of body 58 is provided with a flange 61 that overlies the ring 38.

The members 48 and 59 provide space for accommodating the loaded recoil spring 62. One end of this spring seats upon member 48, and the upper end seats upon the collar 63, which is loosely fitted about the bar 34. Collar 63 normally engages the annular shoulder 64 on the upper end of bushing 59 to resist the normal loading of the spring. Immediately above the collar 63 the rod 34 has an enlarged annular portion 66 to form the abutment shoulders 67 and 68. When no loading is being applied to the drill head, shoulder 67 is urged against the opposed face of the collar 63, by the force of the loaded spring 62.

The upper part 69 of the rod 34 forms what can be referred to as an anvil portion. It is slidably fitted within a bushing 71 that is carried by the sleeve 72. The sleeve 72 is assembled within a bore 73 formed in the upper part of member 58, and is provided with a flange 74 adapted to seat upon the cooperating shoulder face 76. The flange 74 is urged against the shoulder face 76 by suitable means such as a Belleville washer 77. A suitable arrangement of ducts 78 and 79 can be provided for introducing lubricant to the area between the bushing 71 and the anvil portion 69.

The electrical actuator is preferably constructed as follows: It employs a field comprising two electromagnet assemblies 12a and 12b, which serve to operate a central piston-like core 81. The assemblies 12a and 12b can each consist of laminated cores 82 disposed radially about the axis of the central core, and provided with windings 83. The pole pieces 84 and 86 of each laminated core terminate at the boundary of a cylindrical passage 87, within which the central core 81 operates. The two sets of laminated cores are shown separated by the mounting plate 88, and have their outer portions set interposed between the channels 89. The passages 91 formed by these channels permit passage of mud. This arrangement brings the drilling mud into heat exchange relation with the magnetic cores and windings, thus providing for dissipation of heat. The lower ends of channels 89 are sealed with respect to ring 38, and passages 91 have their lower ends in free communication with the passage 41 between the tubes 36 and 37. Filler rings 92 and 93 are interposed between the pole pieces 84 and 86 of each electromagnet assembly, and the filler ring 93 is interposed between the two sets of pole pieces 86.

The central piston-like core 81 is provided with lower and upper axial extensions 94 and 95 of reduced diameter which form impact or hammer elements. The hammer element 94 delivers impacts to the anvil portion 69 of the bar 34. A bearing assembly for element 95 can consist of a sleeve 96 which is mounted upon the laminated cores for the upper electromagnet assembly, and which serves to mount the bushing 97. This bushing is bored to receive the element 95, and is also provided with suitable means such as ducts 98, for introducing lubricant. A similar bearing assembly is formed for the lower element 94. It consists of a sleeve 99 (corresponding to sleeve 96) serving to mount the bushing 101 (corresponding to bushing 97). Here again the bushing can be provided with lubricant receiving ducts 102. At its lower end face the bushing 101 is in direct engagement with the upper end face of the sleeve 72. Also the lubricant ducts 102 can be in communication with ducts 78.

Overlying the upper electromagnet assembly 12a there is an annular plate 106 that is fitted within the channels 89. Above this plate there is a second recoil spring 107 and mounting means for the same. The lower end of spring 107 seats upon the impact receiving member 108, which has its end face 109 aligned with and opposed to the end face of the impact element 95. The member 108 is guided by the bushing ring 111 which is fitted in the upper portion of the sleeve 96. The upper end of the spring 107 seats upon a member 112, which is maintained in spaced relationship with the plate 106 by the tubular shroud 113 and the interposed plate 114. The inner margin of the plate 114 forms an abutment shoulder 115 for the thrust receiving member 108.

As will be presently explained the windings of the electromagnet assemblies are energized by current pulsations whereby the central core 81 is caused to reciprocate a predetermined number of complete strokes per minute. The weight of the moving parts, the strength and pre-loading of the recoil springs, and the frequency of excitation of the windings is such that the core reciprocates at a constant frequency. When no downward force is being applied to the drill head, the force of the downward stroke of the core is absorbed by the lower recoil spring 62. However as the load is applied to the head an increasing amount of the impact energy is transmitted through the bar 34 to the head and to the formation, until a maximum optimum loading is reached, which is equal to the force of the loaded spring 62. By way of example this may be of the order of 30,000 pounds.

A suitable circuit arrangement for exciting the windings of the electromagnet assemblies is shown in Figure 7. The lines L1 and L2 are connected to a suitable source of alternating current, such as 150 volts at 30 cycles. The windings 83 have a common point of connection which connects with one line L1. The other terminals of the windings 83 connect with the rectifiers 116, which have a common point of connection to the other line L2. With this arrangement rectifying pulses are supplied alternately to the two sets of windings, whereby for a current frequency of 30 cycles per second, the central core 81 is reciprocated at a frequency of 3600 complete strokes per minute, thus delivering 1800 impacts per minute. The rectifiers 116 may be of the dry selenium type, the mercury vapor type, or any other type suitable for the current carrying capacity required.

Referring again to Figures 2A and 2B, rectifier units 116 of the dry selenium type are shown disposed within a space 117 provided for this purpose. This space is formed within a tubular housing 118 that is disposed in the upper portion of the main tubular housing 11. The lower closure 119 for the housing 118 can be provided with a sealed fitting 121 to accommodate the conducting wires leading to the windings of the electromagnet assemblies. Also the end member 119 has a rigid sealed connection with the member 112. Thus member 112 has an upwardly extending cylindrical portion 122, which has a threaded engagement 123 with a depending cylindrical portion 124 of the end closure 119. Suitable means such as the O-ring seals 126 provide a fluid tight seal between these parts. The upper ends of channels 89 are attached to the lower edge of a tubular section 127 that surrounds the tubular portion 122, and which abuts the lower end face of the tubular portion 124. Also a ported seating ring 128 can be provided about the tubular section 127, and against which this section may seat.

To maintain the parts of the electrical actuator in assembled relation, we have shown a plurality of tie bolts 129, which at one end engage the member 113, and at the other end engage the member 58.

By reference to Figure 2A it will be seen that the annular passage 91 for circulating mud continues upwardly past the closed housing 118, to the space 131 which overlies the upper end 132 of the housing 118. Space 131 communicates with the lower end of the passage through the drill stem.

Referring back to Figure 1 it will be evident that with the assembly illustrated at Figures 2A-2C attached to the lower end of the drill stem, it is caused to rotate together with rotation of the drill stem, and when the actuator is energized, impacts are applied to the drill head in conjunction with rotation and the discharge of rotary mud for the removal of cuttings.

Suitable means can be employed for extending current carrying conductors down into the well. For example, a suitable two-conductor cable can be threaded through the drill stem, and at the top of the well this cable can connect through slip rings with an exterior generator.

In place of a cable extending down into the well we prefer to use the special drill stem construction shown in Figure 6. Thus the sections 136 of the drill stem are provided with inner tubular conductors 137 and 138 made of suitable materials such as copper or aluminum. These conductors are insulated from the drill stem and from each other by the insulation 139 and 141. The inner wall of 139 can be provided with an abrasion resistant layer of insulation 142, such as a suitable synthetic rubber. The conductor tubes and the associated insulation terminate within the male and female parts 140 and 143 of the stem couplers where they form flat end faces adapted to be compressed together to make good electrical connection. At the top of the drill stem and in conjunction with the swivel head 4, a suitable slip ring device 144 can be provided whereby the conductors make continuous connection with conductors of a stationary cable 145. This cable is shown connected to the generator G, through the suitable control panel 146. The generator can be driven by a suitable motive device, such as electric motor or internal combustion engine.

In practice the equipment described above operates as follows: The drill stem is rotated in accordance with conventional practice, as for example at rotative speeds which may vary from 20 to 350 r.p.m. and at the same time the electrical actuator is energized by current from the generator G, to apply impacts to the drill head at a relatively high and constant frequency, as for example the frequency of 1,800 impacts per minute previously mentioned. The loading upon the drill head, that is, the force with which the head is permitted to bear upon the bottom formation, is adjusted so that it is comparable to the loading required for maximum energy transfer. In the previously mentioned example, this was assumed to be about 30,000 pounds.

When operated in the manner described above, the drilling equipment has a number of remarkable characteristics which can be briefly summarized as follows: Assuming for example that the drill head is operated upon a relatively hard rock formation, the rate of drilling with the actuator in operation is many times the rate for the same rig operating under the same conditions but without operation of the actuator. By way of example, where the drilling rate in a rock formation is of the order of 1 inch per hour, with the actuator in operation the drilling rate is of the order of 10 feet or more per hour. This increase in drilling speed is obtained without excessive power consumption. Actually it appears that the torque required for turning the drill stem is somewhat less when the actuator is in operation, which is attributed to the freeing effect of the vibrations upon all of the rotating parts. Also, this is attributed to the fact that instead of the drilling being due primarily to the turning of the head against the formation, it is due in this instance to the rapid and continued impacts upon the formation, with turning of the head serving primarily to distribute the impact pattern.

When using the drilling equipment described above, it is desirable and important to secure information pertinent to the geological formations encountered as well as the formation immediately underlying and surrounding the drilled area. As previously mentioned, we have discovered that in the operation of such a head, the rapid impacts applied to the formation in the drilling zone cause vibrations which are propagated, reflected and/or refracted to the surface of the earth, and which when picked up at the surface of the earth have characteristic wave patterns. Certain characteristics of the waves as they reach the surface of the well are modified in accordance with certain varying conditions, and such modification when indicated by suitable apparatus, serve to impart valuable information.

Referring to Figure 1, we have shown a number of pickup devices T of the "Geophone" type located at the surface of the earth, and distributed about the top of the well. These Geophones can be transducers of the dynamic type, capable of translating shock or sound waves into corresponding electrical current variations. Suitable holes can be drilled for receiving the Geophones, for each Geophone can be mounted on a bar driven into the ground. An additional Geophone (not shown) can be attached directly to the "Kelly" extended through the rotary tables, and has its terminals connected to an exterior cable 147.

As suitable means for translating the current variations from the different Geophones, all of these devices are shown connected to the input terminals of the multi-channel amplifier network 148, the output of which is shown connected to the recorder 149, which may be one of the multi-channel magnetic tape type, and to a visual indicator 151, which can be one of the oscilloscope type with a separate oscilloscope tube for each Geophone. The sweep voltage for the oscilloscope tubes can be supplied from sweep voltage generator 152 which in turn may be synchronized by a synchronizing connection with the circuit of the generator G.

The system described above with reference to Figure 1 is illustrated in better detail in Figure 7. The Geophone transducers in this instance are numbered T1 to T9, inclusive, with T1 to T8 being disposed symmetrically about the top of the well, that is, at equal radial distances from the well, and spaced equally circumferentially. The various Geophone transducers are again shown connected to the various channels of the amplifier network 148, separate outputs of which are applied to the visual indicator 151. The circles indicated for device 151 represent oscilloscope screens. The screens can be provided with vertical and horizontal base and cross hatch lines to facilitate checking the wave patterns with respect to amplitude, shape, and relative positioning with respect to the vertical and horizontal base lines. Voltages from the outputs of the multi-channel amplifier are applied to the vertical deflecting electrodes of the oscilloscope tubes. A horizontal deflecting voltage of sawtooth wave form is applied to the horizontal deflecting electrodes of the tubes, from the sweep frequency generating means. In Figure 7 the sweep frequency generating means has been shown including a transformer 156 for deriving an alternating voltage from the line L1—L2, leading from the generator G, together with a phase adjuster 157. The output of the phase adjuster is applied through the half-wave rectifier 158 to the trigger pulse generator 161, to provide sharp triggering pulses. These pulses are applied to the sweep generator 162, suitable for generating a sweep voltage having a sawtooth wave form, with each wave being of sufficient length to supply a sweep period which is preferably at least equal to the time period between successive strokes of the electrical actuator. Adjustment of the variations in the phase adjuster 157 makes it possible for an operator to change the phase relationship between the actual reproduced wave forms, and the actual impacts applied by the electrical actuator.

Assuming now that the drilling equipment is in operation at the bottom of the well, and that the well is of substantial depth, the operator can continually observe the wave patterns on the oscilloscope screens, and various characteristics of the reproduced patterns can be used to impart valuable information. For example, assuming that the drill is proceeding through a relatively soft formation, the wave patterns will have a characteristic shape and amplitude determined by such factors as the actual stroke of the drill head under the impact imparted to it, the density, elasticity and continuity of the formation through which the drill is passing, and the ability of this formation and other overlying formations to transmit sound vibrations. Assuming now that the drill engages a considerably harder formation, such as hard rock, certain characteristic changes in the reproduced wave form occur. The waves have more abrupt wave front, and the amplitude increases. Similarly, characteristic changes occur when the drill passes from a hard to a softer formation. If the drill should pass from a softer to a harder but faulted formation, the axis of the maximum directivity is no longer vertical, and as a result there will be a variation in the amplitude or complete disruption of the wave patterns for the oscilloscopes connected to certain of the Geophones T1—T8. The differences in amplitude when examined by the operator will reveal the general direction or strike of the declination, and to some extent, the angle or dip of the formation.

In addition to the information referred to above, the indications of the oscilloscopes also give some information with respect to the formations intervening between the earth's surface and the bottom of the well. Thus with the depth of the well being known, there is a phase difference between the wave form as received by Geophone T9 and the waves from the Geophones which are in contact with the earth. Geophone T9 receives waves transmitted as sound directly through the drill stem, and therefore the phase relation of such waves to the exciting current for the actuator is a function of the depth of the well. Therefore, these phase differences when compared are an indication of the general or average density, elasticity and absorptivity of the formations through which the drill has passed, and provide a continuous log in relation to the type of formations drilled.

In addition to the information referred to above, which concerns the character of the formation being operated upon by the drilling equipment, one or more Geophones and indicating devices used in the manner described above can be used advantageously to keep continuous check of the operation of the drill to make certain that it is functioning properly, and is applying percussion impacts of proper intensity to the drill head. For this purpose it is sufficient to use one Geophone together with a single indicating device, with a Geophone either in contact with the earth, or mounted in direct sound transmitting contact with the drill stem.

Instead of mounting a Geophone at the top of the well on the "Kelly," as previously described, a Geophone may be mounted upon the assembly 1, immediately above the drill head. Such an arrangement requires circuit connections extended down into the well for making connection with the visual indicator. Instead of using separate conductors with such a Geophone, the current variations which it produces can be imposed upon a circuit which makes use of one of the conductors for the actuator as one side of its circuit, and the drill stem itself for the other side. In Figure 2C such a Geophone T10 has been mounted upon the housing 11, immediately above the drill head 10. Its operating element or diaphragm is in contact with the drilling mud about the housing 11.

An additional Geophone may be employed advantageously to keep a continuous check on the consistency of the mud flowing in the drilled hole. The Geophone may be mounted, for example, near the mud discharge pipe 8 with its operating element or diaphragm in contact with the mud. The wave pattern would provide a continuous check of the consistency of the mud.

Another embodiment of the system described with reference to Figure 1 is illustrated in detail in Figure 8. The Geophone transducers in this instance are numbered T11 to T23, inclusive, and are radially disposed about the well. The various Geophone transducers are again shown connected to the various channels of the amplifier network 148a, separate outputs of which are connected to the visual indicator 151a, the operation of which has been described. The sweep frequency generating means has also been described with reference to Figure 7.

Assuming now that the well drilling equipment is in operation at the bottom of a well, and the well is of substantial depth, the operator can continuously observe the wave patterns on the oscilloscope screens. The characteristics of the patterns impart valuable information respecting the extent and depth of the formation.

Previous reference has been made to the fact that the recorder 149 can be of the multi-channel magnetic tape type. The tape of this recorder can be operated at a suitable constant speed whereby it records all of the current variations from the various Geophone transducers. At a later time such magnetic records can be used to operate visual indicators, or the records mixed for the purpose of reproducing composite wave patterns. Also, if desired, the records can be reproduced for the purpose of operating a recorder of the pen type.

We claim:

1. In a method applicable to a rotary drilling rig in which a rotary drill stem extends into the earth and carries a drilling head at its lower end, the method comprising applying vertical impacts to the drilling head as it is being rotated against the formation, said impacts being applied at a constant frequency whereby periodic waves are created, detecting the resulting waves at the surface of the earth, forming a signal which has a predetermined phase relationship with respect to the applied impacts, and varying the phase of said signal to thereby obtain a predetermined phase relationship between the detected waves and said signal to facilitate comparison of the phase relationship between the signal and the detected waves.

2. An apparatus for logging earth wells during drilling of the same where the drilling operation is carried out by a rotary drilling head which is rapidly impacted at a constant frequency against the bottom of the well while it is being rotated, said apparatus comprising a plurality of wave pickup transducers located at the surface of the earth and in vibration receiving contact therewith, electrical response means connected to receive the output of said transducers and forming electrical signals corresponding to the received waves, means forming a signal which has a predetermined phase relationship with respect to the applied impacts, a phase adjuster connected to receive said last signal and serving to vary its phase with respect to the electrical signals formed by the transducers, and means for indicating all of said electrical signals.

3. An apparatus for logging earth wells during drilling of the same where the drilling operation is carired out by a rotary drilling head which is rapidly impacted at a constant frequency against the bottom of the well while it is being rotated comprising a plurality of wave pickup transducers located at the surface of the earth and in vibration receiving contact therewith, each of said wave pickup transducers serving to form an electrical signal corresponding to the vibrations picked up by the same, amplifier means connected to receive each of said transducer electrical signals and amplify the same, a plurality of cathode ray means having vertical and horizontal deflection means each connected to receive an amplified transducer signal, said signals being applied to the vertical deflection means of their respective cathode ray means, means forming a reference signal which has a predetermined phase relationship with respect to the applied impacts, phase adjusting means serving to receive said reference signal and to vary its phase, sweep voltage generator means connected to receive the output of said phase adjusting means, the output of said generator being connected to the horizontal deflection means of each of the cathode ray means, said phase adjusting means permitting the adjustment of the phase relationship between the signals applied to the horizontal and vertical deflection means to thereby permit rapid analysis of the signals.

4. An apparatus for logging earth wells during drilling of the same, wherein the drilling operation is carried out by a rotary drilling head which is rapidly impacted at a constant frequency against the bottom of the well by an electromagnetic assembly while it is being rotated, the electromagnetic assembly being energized by an alternating current source at the surface of the well, comprising a plurality of seismic wave pickup transducers located at the surface of the earth and in vibration receiving contact therewith, electrical response means connected to receive the output of said transducers and form an electrical signal corresponding to the received seismic wave, means forming a reference signal from the alternating current, said signal having a predetermined phase relationship with respect to the applied impacts, a phase adjusted connected to receive said refernece signal and serving to vary its phase with respect to the electrical signals formed by the transducers, a plurality of cathode ray means having horizontal and vertical deflection means for displaying said signals, one for each of said transducers, said reference signals being applied to one of the deflection means of each of said cathode ray means, and the electrical signals formed by the transducers applied to the other deflection means of individual ones of said cathode ray means.

References Cited in the file of this patent

UNITED STATES PATENTS

| | | |
|---|---|---|
| 1,843,725 | Karcher | Feb. 2, 1932 |
| 1,891,062 | Sager | Dec. 13, 1932 |
| 2,062,151 | Weatherby | Nov. 24, 1936 |
| 2,275,736 | Cloud | Mar. 10, 1942 |
| 2,355,826 | Sharpe | Aug. 15, 1944 |
| 2,452,515 | Athy | Oct. 26, 1948 |
| 2,554,005 | Bodine | May 22, 1951 |
| 2,557,168 | Arps, et al. | June 19, 1951 |
| 2,569,411 | Ellis | Sept. 25, 1951 |
| 2,651,027 | Vogel | Sept. 1, 1953 |
| 2,655,343 | Pestarini | Oct. 13, 1953 |
| 2,728,405 | Brant | Dec. 27, 1955 |